US008346411B1

(12) United States Patent
Dirks et al.

(10) Patent No.: US 8,346,411 B1
(45) Date of Patent: Jan. 1, 2013

(54) INTEGRATED SYSTEM FOR PROVIDING A JOURNEY LOG DISPLAY AND THE AUTOMATIC REPORTING THEREOF

(75) Inventors: Charles B. Dirks, Swisher, IA (US); Michael J. Krenz, Roscoe, IL (US); Kevin Delaney, Cedar Rapids, IA (US); James L. Scheer, Hiawatha, IA (US); Joseph M. Costello, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 612 days.

(21) Appl. No.: 12/541,954

(22) Filed: Aug. 16, 2009

(51) Int. Cl.
*G06F 7/70* (2006.01)

(52) U.S. Cl. .................... 701/14; 701/3; 701/4; 701/17; 701/467; 701/468; 340/425.5; 340/426.13; 340/426.16

(58) Field of Classification Search ................ 701/3–18, 701/467, 468; 340/425.5, 426.13, 426.16
See application file for complete search history.

(56) References Cited

U.S. PATENT DOCUMENTS

| | | | | |
|---|---|---|---|---|
| 6,278,913 | B1 * | 8/2001 | Jiang | 701/3 |
| 6,526,341 | B1 * | 2/2003 | Bird et al. | 701/31.4 |
| 6,633,801 | B1 * | 10/2003 | Durlacher et al. | 701/9 |
| 6,711,475 | B2 * | 3/2004 | Murphy | 701/3 |
| 6,868,320 | B1 * | 3/2005 | Burch | 701/467 |
| 7,415,336 | B1 * | 8/2008 | Burch | 701/468 |
| 8,180,562 | B2 * | 5/2012 | Clark et al. | 701/446 |
| 2002/0035416 | A1 * | 3/2002 | De Leon | 701/14 |
| 2002/0103865 | A1 * | 8/2002 | Lilly | 709/205 |
| 2003/0036827 | A1 * | 2/2003 | Murphy | 701/3 |
| 2004/0174295 | A1 * | 9/2004 | Stayton et al. | 342/182 |
| 2005/0248444 | A1 * | 11/2005 | Joao | 340/426.13 |
| 2008/0078881 | A1 * | 4/2008 | Parras | 244/137.1 |
| 2009/0150012 | A1 * | 6/2009 | Agam et al. | 701/3 |
| 2009/0325131 | A1 * | 12/2009 | Cernasov et al. | 434/30 |

* cited by examiner

*Primary Examiner* — Dalena Tran
*Assistant Examiner* — Jonathan L Sample
(74) *Attorney, Agent, or Firm* — Donna P. Suchy; Daniel M. Barbieri

(57) ABSTRACT

An integrated system for providing a reporting point journey log display in an aircraft and for providing the automatic transfer and installation of a reporting point journey log in a ground retention application. The integrated system includes means for procuring and aggregating reporting point on-board aircraft data from aircraft systems. Means are provided for generating a reporting point cockpit message and readback script from the aggregated reporting point onboard aircraft data. The aggregated reporting point onboard aircraft data is automatically transmitted to a receiving ground application for assembling the data into the form of a reporting point journey log. The reporting point journey log is installed into a ground storage application.

15 Claims, 3 Drawing Sheets

INTEGRATED SYSTEM FOR PROVIDING A JOURNEY LOG DISPLAY AND THE AUTOMATIC REPORTING THEREOF

BACKGROUND OF THE INVENTION

1. Field of the Invention

The present invention relates generally to flight and journey logs for aircraft, and more particularly, to the utilization of forward displays and integrated avionics data capture as a means to automate and streamline the logging process.

2. Description of the Related Art

Modern business aircraft have become increasingly complex, from a system, electronics and data perspective. Specifically, aircraft systems now rely on digitized data for typical operational requirements like enroute navigation data, terminal area navigation data, maintenance status and health of aircraft systems, etc. This data which, in the past, existed as paper documents, now resides on the aircraft electronics systems in a digitized format. Furthermore, modern aircraft systems are increasingly becoming connected and integrated in the aircraft as components of the overall aircraft network thus allowing internal communication between diverse aircraft systems. This has led to the potential for improved aircraft data management.

The Flight & Journey Logs are common artifacts that are required for recording of flight operations on business and regional aircraft. In today's operations, the Oceanic Journey Log is recorded manually by the pilot, typically on the actual printed oceanic flight plan. After the completion of the trip, this document is required to be stored in the pilot's training records, for at least six months after the actual trip. The log is required to be presented to the regulator in case of suspected Gross Navigational Error (GNE) or an International Flight Operations Audit. Frequently, because of their manual nature, these logs are lost or are illegible due to poor handwriting or turbulence.

U.S. Pat. No. 6,868,320, entitled "Methods, Devices, and Systems for Automatic Flight Logs," discloses some systems, devices and methods for automatic flight logs. One method includes receiving one or more location data points associated with a flight, automatically recording the one or more location data points in a flight log, and allowing access through a display user-interface to view and operate on the flight log. Receiving the one or more location data points includes obtaining the location data points from a global positioning system (GPS).

U.S. Pat. Publcn. No. 20020103865, entitled "Logbook Database System," discloses a method and system for recording the actions and activities (as for a logbook) of a person, persons, machines, or other animate or inanimate objects using portable or stationary devices. These devices are (1) directly connected, or wired, or (2) are connected wirelessly to a local (LAN) or wide area network (WAN). The actions or activity are either immediately transmitted to the local or wide area network and received and recorded on a server system, or recorded and held in the wired/wireless device and then transmitted to the server system at a later date. Once recorded on the server system, the actions and activities are accessible to wired or wireless devices via local or wide area networks or available to other server systems. They can be reviewed and acknowledged by an authoritative entity through the use of an electronic signature facility.

SUMMARY OF THE INVENTION

In a broad aspect, the present invention is an integrated system for providing a reporting point journey log display in an aircraft and for providing the automatic transfer and installation of a reporting point journey log in a ground retention application. The integrated system includes means for procuring and aggregating reporting point on-board aircraft data from aircraft systems. Means are provided for generating a reporting point cockpit message and readback script from the aggregated reporting point onboard aircraft data. The aggregated reporting point onboard aircraft data is automatically transmitted to a receiving ground application for assembling the data into the form of a reporting point journey log. The reporting point journey log is installed into a ground storage application.

The set of data procured and aggregated may include: a) wind direction, speed and temperature data from an air data system; b) time data at reporting point crossings; and, name and coordinates data of reporting points from a flight management system; c) flight level data from an altimetry system; d) time to next reporting point data; and, location and time to next reporting point data, from a flight management system; e) follow-on reporting point data from a flight management system; f) status data from an engine indication system (EICAS); and, g) aircraft discrete input data from the aircraft.

Current display formats, such as ARINC 661 display formats, are capable of hosting formats which allow display and/or entering of flight related fields. These formats may be auto-populated, in accordance with the principles of this invention, using data fields captured from a controlled Ethernet network, such as an AFDX network. This process of auto-population enables: a) reduced time to complete logs; b) consistent recording; c) standardized recording formats for date & time; d) reduced post flight activities for paper process management; and, e) improved compliance with mandatory international operations record keeping.

DETAILED DESCRIPTION OF THE INVENTION

Figure 1:
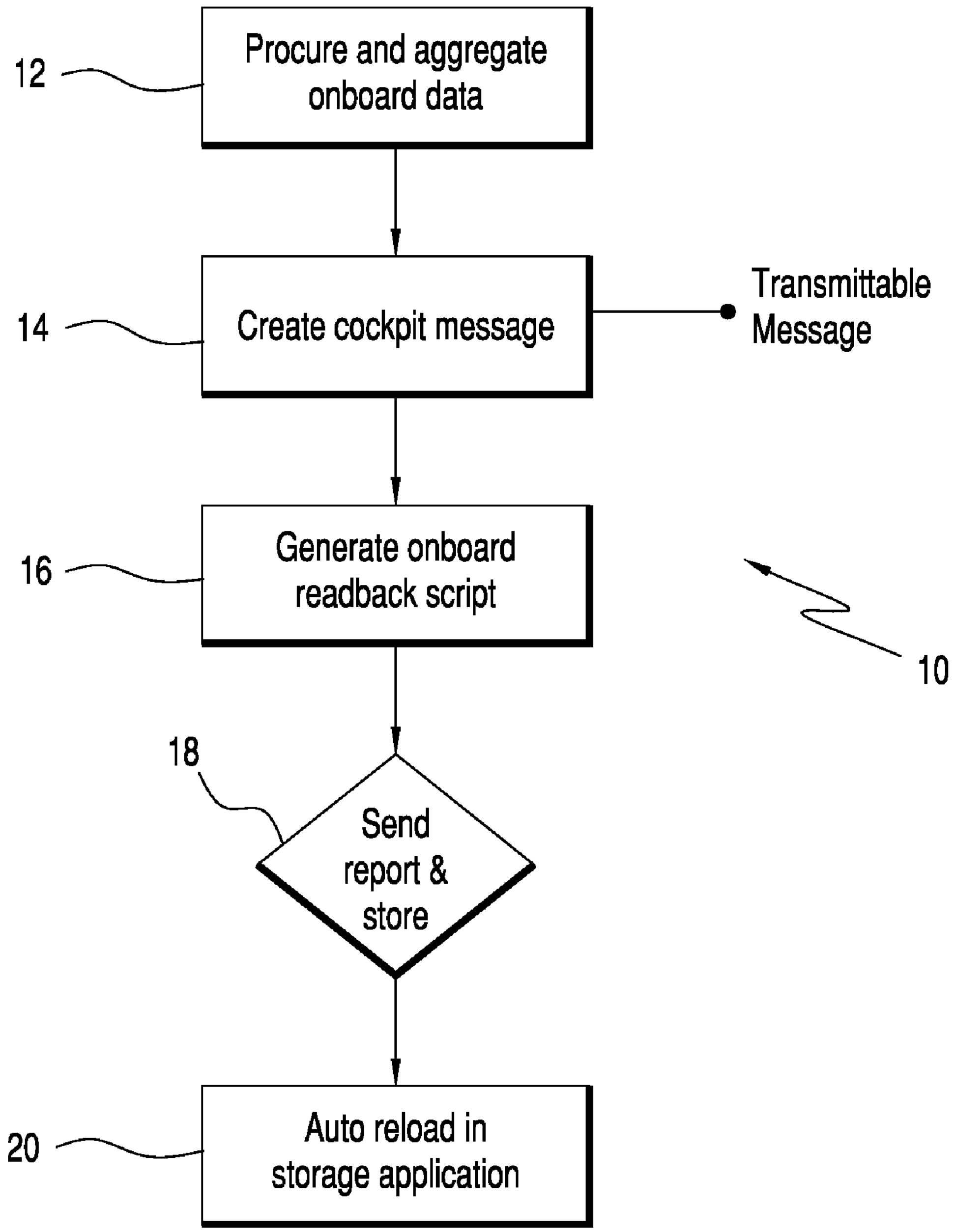
FIG. 1 is a diagrammatic top level illustration of the integrated system for providing a reporting point journey log display in an aircraft and for providing the automatic transfer and installation of a reporting point journey log in a ground retention application, in accordance with the principles of the present invention.

Referring now to the drawings and the characters of reference marked thereon, FIG. 1 illustrates the integrated system for providing a reporting point journey log display in an aircraft and for providing the automatic transfer and installation of a reporting point journey log in a ground retention application, in accordance with the principles of the present invention, designated generally as 10. Reporting point onboard aircraft data is procured and aggregated by appropriate means 12, typically a computer system such as an onboard maintenance system or remote data concentrator processing subsystem. It may be a real time operating system (RTOS). The onboard aircraft data may be, for example, from multiple sensors and databases within the airplane. This may include, for example, flight level and winds, time at reporting point crossing, name and coordinates of reporting point, flight level, time to next reporting point and location of next reporting point, follow on reporting point, fuel on-board, and fuel status. This information may be received from various aircraft systems, including the flight management system (FMS), graphics generator, air data system, and CAS system.

A reporting point cockpit message and readback script (i.e. display format) are generated from the aggregated reporting point onboard aircraft data, as indicated by process blocks 14 and 16, from the aggregated reporting point onboard aircraft data. The cockpit message is typically a data avionics system (CAS) message from a cockpit warning system or an onboard maintenance system (OMS) message. The readback script (i.e. onboard visual reporting format) is a readable item that can be easily read back by the pilot to the controller (i.e. cockpit readable format). In an automated advanced system the message might not even be needed to be read back. It could be sent back by Automatic Dependent Surveillance—Broadcast (ADS-B) technologies.

The aggregated reporting point onboard aircraft data is temporarily stored in the aircraft and automatically transmitted to a receiving ground application for assembling the data into the form of a reporting point journey log, as indicated by block 18. The receiving ground application, i.e. network operations center, in assembling the data, takes a substantial part of the work load away from the crew. It is stored by the receiving ground application.

The reporting point journey log is installed into a ground storage application (process block 20). The appropriate software is used for installing the application and reconfiguring it into the appropriate format so that it appears as it was when back on the aircraft. The appropriate software, may be, for example, ground storage application (GSA) software and accompanying hardware, which may be commercially available hardware.

Figure 2:
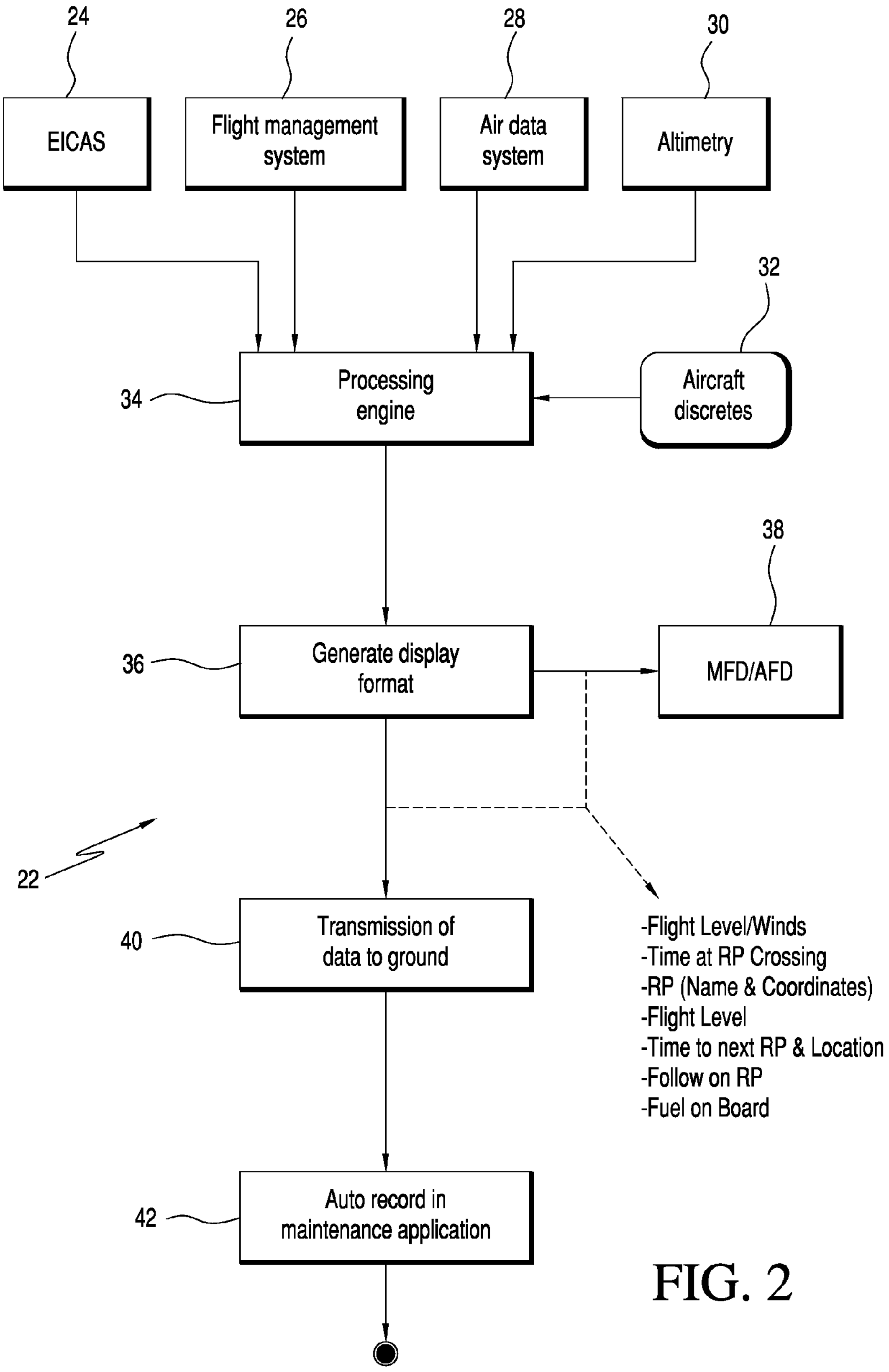
FIG. 2 is a system level illustration of the integrated system.

Referring now to FIG. 2, a system level illustration of the integrated system of the present invention is illustrated, designated generally as 22. As illustrated in this Figure, an engine indication system (EISCAS) 24 provides fuel status data. A flight management system (FMS) 26 provides time data at reporting point crossings, name and coordinates data of reporting points; and, follow-on reporting point data. An air data system 28 provides wind direction, speed and temperature data. An altimetry system 30 provides flight level data.

The above reporting point on-board aircraft data, as well as other aircraft discrete input data 32 from the aircraft is procured and aggregated and then processed by a processing engine 34, i.e. the correlative to block 12 discussed above. Discretes are generally not tied into specific systems of the aircraft. They are related to the environmental states of the aircraft, i.e. Weight on Wheels, Cabin Doors Open, etc. The aggregated reporting point onboard aircraft data may be temporarily stored on the aircraft.

The data may be procured and aggregated by an Ethernet or non-Ethernet network. Inasmuch as this is a highly critical application, a controlled Ethernet network, such as an AFDX network may be used.

The display format (i.e. reporting point cockpit message and readback script) is generated, as indicated by process block 36. As noted above, the display format may include information such as flight level and winds, time at reporting point crossing, name and coordinates of reporting point, flight level, time to next reporting point and location of next reporting point, follow on reporting point, fuel on-board, and fuel status. The cockpit message and readback script may be generated in a customized format in accordance with operator preference and local reporting standards (i.e. local air traffic control standards, airline operator standards, and safety standards).

A switch may be included for turning off the automatic generation of the readback script. The display format may be directed to a flight display such as a multi-function display (MFD) or adaptive flight display (AFD), as indicated by process block 38.

The reporting point cockpit message and readback script generating means may include a configurable event trigger mechanism for the auto generation thereof. These triggers may include, for example, time deltas, position deltas (latitude, longitude or both), speed deltas, temperature deltas, altitude deltas, etc.

The transmission of data to the ground (process block 40) can be accomplished by satellite communication systems in-flight using, for example, Iridium or SATCOM connections. However, when automatic data communication is unavailable, means can be provided for manually transmitting the aggregated reporting point onboard aircraft data while on the ground. Communication may be unavailable due to the geographic situation or system faults. Manual ground transmissions can be accomplished by, for example, Cellular, WiFi (802.11b/g) or USB (manual) connections.

Consistent with FIG. 1, the reporting point journey log is installed into a ground storage application (process block 42 in FIG. 2).

Figure 3:
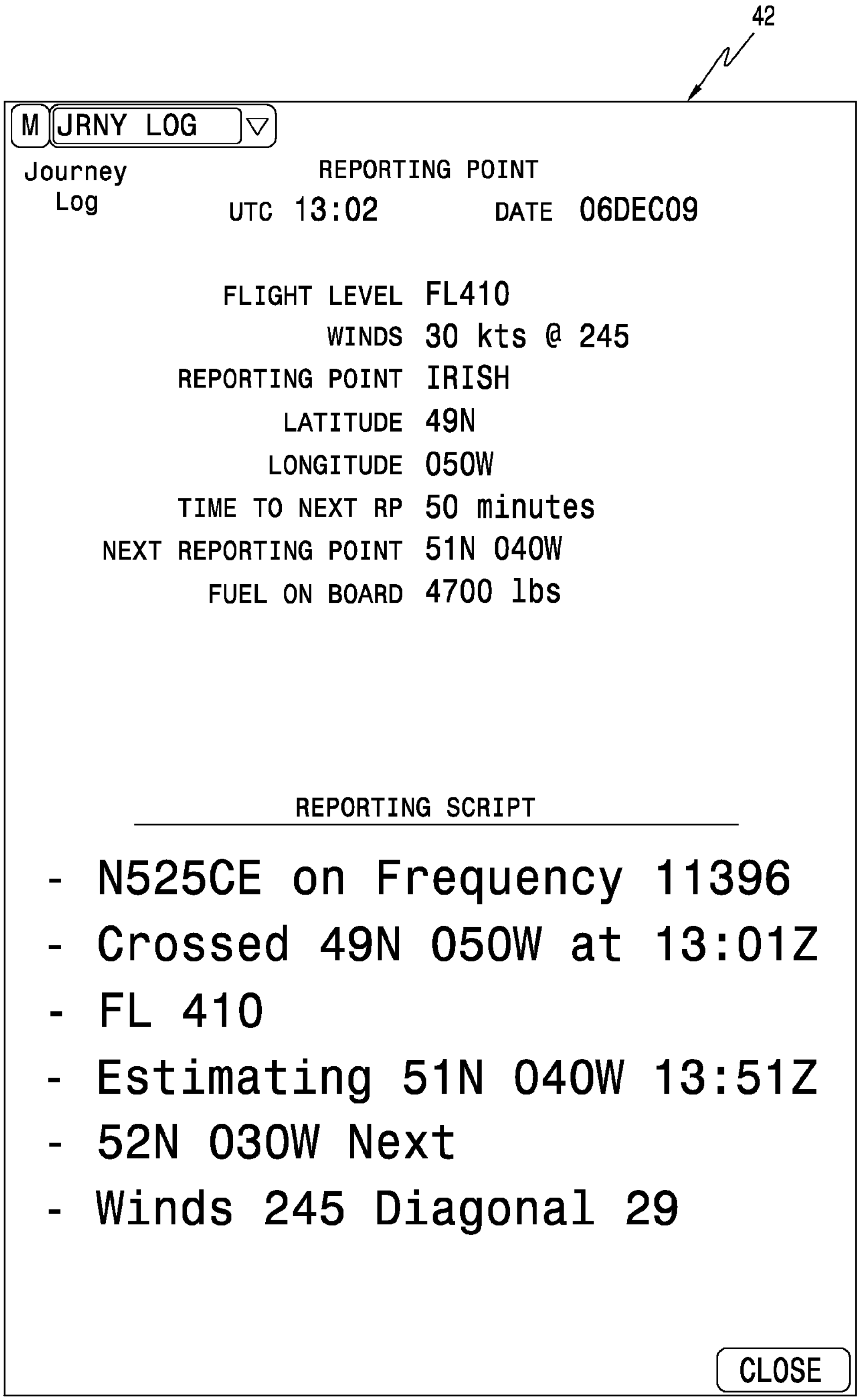
FIG. 3 is an illustration of a sample journey log.

Referring now to FIG. 3, a sample journey log is illustrated, designated generally as 42. The journey log 42 includes salient reporting point information and a reporting script. As discussed above, the format can be adapted, in accordance with the principles of this invention depending upon the operator needs and region of the world.

The present invention allows for customization of the formats to account for variances in the application of the logs by individual operators. For example, if displayed on the ARINC 661 displays such as, for example, the PRO LINE FUSION™ integrated flight display, manufactured by Rockwell Collins, Inc., the ARINC 661 visualization layer definition would vary between aircraft, while the source set of inputs and their associated rate of collection, as derived from the AFDX network, would be common for all PRO LINE FUSION™ implementations. This minimizes the risk of increased bandwidth requirements on the AFDX network as the result of implementation of this concept.

As noted above, the present invention provides for automatically recording the desired information at the proper time or interval. Default configurations are provided to specify standard recording such as OOOI times, all latitude/longitude crossing statistics associated with oceanic clearances, all flight plan waypoint crossing statistics. Other points (e.g. altitude change points) may be selected from a list by the user. Customization from a list of possible items to flight and journey log requirements and the ability to use the custom selections to conform to user reporting standards is unique in the aviation environment. Another element of customization provided is the set of parameters to be recorded at the various specified recording points. This selectable list includes not only the standard items of date, time and altitude, but also aircraft related items such as fuel quantity, thrust setting, outside air temperature, current winds, airspeed, and potentially manually recorded crew notes as well.

These inventive concepts can be applied to advanced integrated flight decks from; for example, Rockwell Collins, Inc., marketed under the trademarks PRO LINE FUSION™ and PRO LINE 21™, where field values may be derived from the ARINC 429 networks of the aircraft. Again, the set of parameters and their associated rates of collection would be standard across the PRO LINE™ implementations allowing for aircraft operators to custom configure flight and journey logs to their operational needs and data requirements.

The flight and journey logs can be automatically archived for the required durations. As some information may have different duration requirements, a mechanism is also provided to automatically "strip down" the logs after various time intervals to only retain the required information if desired. This is very similar to the document management policies put in place for other records (e.g. financial) taken to the next level allowing automated slimming of the content over time at user set intervals.

Other embodiments and configurations may be devised without departing from the spirit of the invention and the scope of the appended claims.

The invention claimed is:

1. An integrated system for providing a reporting point journey log display in an aircraft and for providing the automatic transfer and installation of a reporting point journey log in a ground retention application, comprising:

a) means for procuring and aggregating reporting point on-board aircraft data from aircraft systems;

b) means for generating a reporting point cockpit message and readback script from said aggregated reporting point onboard aircraft data, wherein said readback script comprises a definable display format having customizable formatting in accordance with operator preference and local reporting standards, said display format including data selected from the set of airplane data comprising flight level, winds, time at reporting point crossing, coordinates of reporting point, time to next reporting point and location of next reporting point, and follow on reporting point; and, wherein said means for generating a reporting point cockpit message and readback script comprises a configurable event trigger mechanism for the auto generation thereof, said trigger mechanism having a trigger including time deltas, position deltas, and temperature deltas;

c) means for automatically transmitting said aggregated reporting point onboard aircraft data to a receiving ground application for assembling the data into the form of a reporting point journey log; and, d) means for installing said reporting point journey log into a ground storage application.

2. The integrated system of claim 1, wherein said means for procuring and aggregating reporting point on-board aircraft data from aircraft systems comprises procuring and aggregating data selected from the set of aircraft data, comprising:

a) wind direction, speed and temperature data from an air data system;

b) time data at reporting point crossings; and, name and coordinates data of reporting points from a flight management system;

c) flight level data from an altimetry system;

d) time to next reporting point data; and, location and time to next reporting point data, from a flight management system;

e) follow-on reporting point data from a flight management system;

f) fuel status data from an engine indication system (EICAS); and, g) aircraft discrete input data from the aircraft.

3. The integrated system of claim 1, wherein said means for generating a reporting point cockpit message and readback script comprises a switch for turning off the automatic generation of the readback script.

4. The integrated system of claim 1, wherein said means for generating a reporting point cockpit message and readback script comprises means for temporarily storing said aggregated reporting point onboard aircraft data on the aircraft.

5. The integrated system of claim 1, wherein said means for procuring and aggregating reporting point on-board aircraft data comprises means for utilizing an Ethernet or non-Ethernet network.

6. The integrated system of claim 1, wherein said means for automatically transmitting said aggregated reporting point onboard aircraft data to a receiving ground application further includes means for manually transmitting said aggregated reporting point onboard aircraft data when automatic data communication is unavailable.

7. A method for providing a reporting point journey log display in an aircraft and for providing the automatic transfer and installation of a reporting point journey log in a ground retention application, comprising the steps of:

a) procuring and aggregating reporting point on-board aircraft data from aircraft systems;

b) generating a reporting point cockpit message and readback script from said aggregated reporting point onboard aircraft data, wherein said readback script comprises a definable display format having customizable formatting in accordance with operator preference and local reporting standards, said display format including data selected from the set of airplane data comprising flight level, winds, time at reporting point crossing, coordinates of reporting point, time to next reporting point and location of next reporting point, and follow on reporting point; and, wherein said means for generating a reporting point cockpit message and readback script comprises a configurable event trigger mechanism for the auto generation thereof, said trigger mechanism having a trigger including time deltas, position deltas, and temperature deltas;

c) automatically transmitting said aggregated reporting point onboard aircraft data to a receiving ground application for assembling the data into the form of a reporting point journey log; and, d) reporting point journey log into a ground storage application.

8. The method of claim 7, wherein said step of procuring and aggregating reporting point on-board aircraft data from aircraft systems, comprises the steps of:

a) procuring wind direction, speed and temperature data from an air data system;

b) procuring time data at reporting point crossings; and, name and coordinates data of reporting points from a flight management system;

c) procuring flight level data from an altimetry system;

d) procuring time to next reporting point data; and, location and time to next reporting point data, from a flight management system;

e) procuring follow-on reporting point data from a flight management system;

f) procuring fuel status data from an engine indication system (EICAS); and, g) procuring aircraft discrete input data from the aircraft

9. The method of claim 7, wherein said step of generating a reporting point cockpit message and readback script further comprises the step of utilizing a switch for turning off the automatic generation of the readback script.

10. The method of claim 7, wherein said step of generating a reporting point cockpit message and readback script further comprises the step of utilizing a switch for turning off the automatic generation of the readback script.

11. The method of claim 7, wherein said step of procuring and aggregating reporting point on-board aircraft data from aircraft systems, comprises the step utilizing an Ethernet or non-Ethernet network.

12. The method of claim 7, wherein said step of automatically transmitting said aggregated reporting point onboard aircraft data to a receiving ground application comprises the step of manually transmitting said aggregated reporting point onboard aircraft data when automatic data communication is unavailable.

13. An integrated system for providing a reporting point journey log display in an aircraft and for providing the automatic transfer and installation of a reporting point journey log in a ground retention application, comprising:

a) a plurality of aircraft systems, comprising:

i) an air data system for providing wind direction, speed and temperature data;

ii) a flight management system for providing time data at reporting point crossings; name and coordinates data of reporting points; time to next reporting point data; location and time to next reporting point data; and, follow-on reporting point data;

iii) an altimetry system for providing flight level data; and, iv) an engine indication system (EICAS) for providing fuel status data;

b) means for procuring and aggregating reporting point on-board aircraft data from said plurality of aircraft systems and aircraft discrete input data from the aircraft;

c) means for generating a reporting point cockpit message and readback script from said aggregated reporting point onboard aircraft data, wherein said readback script comprises a definable display format having customizable formatting in accordance with operator preference and local reporting standards, said display format including data selected from the set of airplane data comprising flight level, winds, time at reporting point crossing, coordinates of reporting point, time to next reporting point and location of next reporting point, and follow on reporting point; and, wherein said means for generating a reporting point cockpit message and readback script comprises a configurable event trigger mechanism for the auto generation thereof, said trigger mechanism having a trigger including time deltas, position deltas, and temperature deltas;

d) means for automatically transmitting said aggregated reporting point onboard aircraft data to a receiving ground application for assembling the data into the form of a reporting point journey log; and, e) means for installing said reporting point journey log into a ground storage application.

14. The integrated system of claim 13, wherein said means for generating a reporting point cockpit message and readback script comprises a switch for turning off the automatic generation of the readback script.

15. The integrated system of claim 13, wherein said means for generating a reporting point cockpit message and readback script comprises means for temporarily storing said aggregated reporting point onboard aircraft data on the aircraft.

* * * * *